US009165200B2

(12) United States Patent
Markham et al.

(10) Patent No.: US 9,165,200 B2
(45) Date of Patent: Oct. 20, 2015

(54) IMAGE PROCESSING FOR PRIORITIZING POTENTIAL OBJECTS OF INTEREST IN A FIELD OF VIEW

(75) Inventors: Keith Christopher Markham, Monmouthsire (GB); Andrew John Sherriff, Bristol (GB); Philip Nathan Townsend, Bath (GB)

(73) Assignee: MBDA UK LIMITED, Stevenage, Hertfordshire (GB)

( * ) Notice: Subject to any disclaimer, the term of this patent is extended or adjusted under 35 U.S.C. 154(b) by 163 days.

(21) Appl. No.: 13/811,160

(22) PCT Filed: Jul. 18, 2011

(86) PCT No.: PCT/GB2011/051341
§ 371 (c)(1),
(2), (4) Date: Jan. 18, 2013

(87) PCT Pub. No.: WO2012/010873
PCT Pub. Date: Jan. 26, 2012

(65) Prior Publication Data
US 2013/0148893 A1    Jun. 13, 2013

(30) Foreign Application Priority Data
Jul. 21, 2010 (EP) .................................... 10275077
Jul. 21, 2010 (GB) .................................... 1012221.6

(51) Int. Cl.
*G06K 9/46* (2006.01)
*G06K 9/32* (2006.01)
(52) U.S. Cl.
CPC ............... *G06K 9/32* (2013.01); *G06K 9/3241* (2013.01); *G06K 9/4671* (2013.01)

(58) Field of Classification Search
None
See application file for complete search history.

(56) References Cited

U.S. PATENT DOCUMENTS

| 6,690,814 B1* | 2/2004 | Yuasa et al. .................... 382/118 |
| 6,801,645 B1 | 10/2004 | Collins et al. |
| 2004/0234157 A1 | 11/2004 | Forman et al. |
| 2008/0166014 A1* | 7/2008 | Marcus et al. ................. 382/103 |
| 2009/0143693 A1* | 6/2009 | Ye et al. .......................... 600/523 |
| 2009/0226033 A1* | 9/2009 | Sefcik ............................ 382/103 |

FOREIGN PATENT DOCUMENTS

| EP | 1 693 782 A1 | 8/2006 |
| EP | 1 897 495 A1 | 3/2008 |
| EP | 2 079 054 A1 | 7/2009 |

(Continued)

OTHER PUBLICATIONS

International Preliminary Report on Patentability and Written Opinion, dated Jan. 31, 2013 from related International Application No. PCT/GB2011/051341.

(Continued)

*Primary Examiner* — Siamak Harandi
(74) *Attorney, Agent, or Firm* — Scully, Scott, Murphy & Presser, P.C.

(57) ABSTRACT

An image-processing method comprising convolving a selected feature of interest (FOI) within the image with a mask of a first size, repeating the convolution with a mask of a second size, and calculating the ratio of the convolution responses, as an indication of the size of the FOI. Preferably the convolution masks are Laplacian of Gaussian. The method can be useful for prioritizing potential targets in a field of view for presentation to an operator.

22 Claims, 4 Drawing Sheets

(56) References Cited

FOREIGN PATENT DOCUMENTS

| EP | 2 110 697 A1 | 10/2009 |
|---|---|---|
| GB | 2 422 739 A | 8/2006 |
| WO | 86/01920 A1 | 3/1986 |
| WO | WO 2007/031946 A2 | 3/2007 |
| WO | WO 2008/082470 A1 | 7/2008 |
| WO | 2008/114016 A2 | 9/2008 |

OTHER PUBLICATIONS

Domenec Puig et al, "Determining optimal window size for texture feature extraction methods," IX Spanish Symposium on Pattern Recognition and Image Analysis (2001) vol. 2, pp. 237-242.

Robert M. Haralick et al, "Textural Features for Image Classification," IEEE Transactions on Systems, Man and Cybernetics (1973) vol. 3 No. 6, pp. 610-621.

Extended European Search Report dated Dec. 13, 2010 issued in European Publication No. EP 10275077.5.

International Search Report dated Nov. 9, 2011 issued in PCT/GB2011/051341.

UK Search Report dated Jun. 3, 2011 issued in UK Publication No. GB 1012221.6.

Australian Office Action dated Dec. 10, 2013 from related Australian Application No. 2011281313.

Great Britain Search Report dated Nov. 22, 2010 from related Great Britain Application No. GB 1012221.6.

* cited by examiner

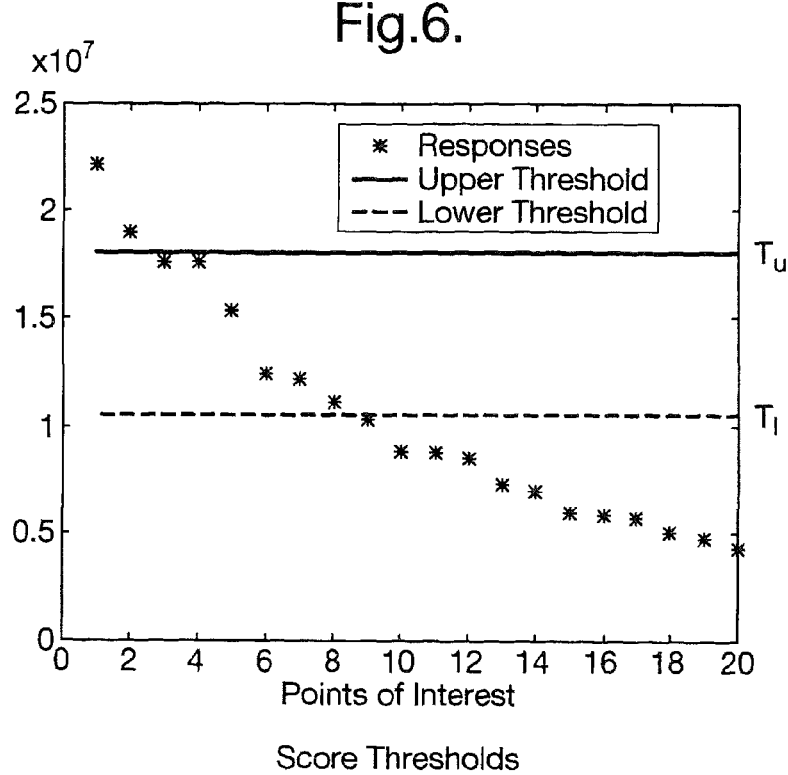
Score Thresholds
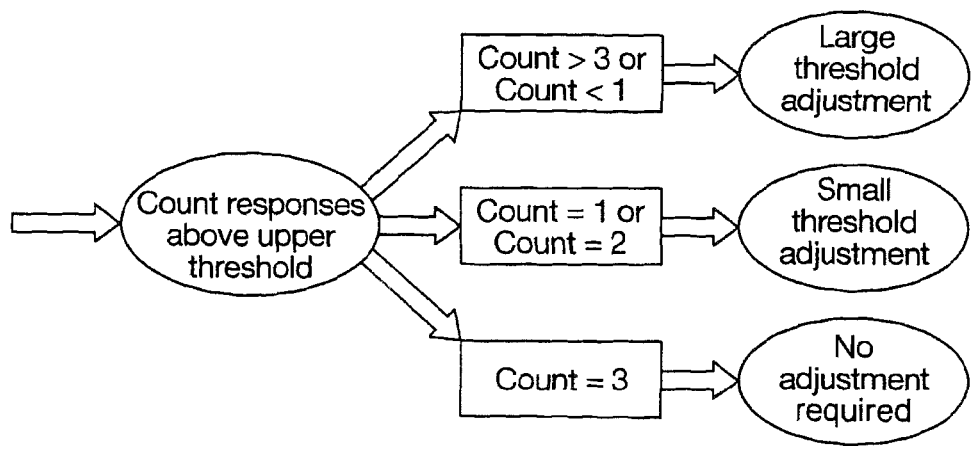

Laplacian of Gaussian Components

IMAGE PROCESSING FOR PRIORITIZING POTENTIAL OBJECTS OF INTEREST IN A FIELD OF VIEW

This invention relates to an image processing method, to image processing apparatus configured to operate the method and to a computer readable medium comprising a computer program for performing the method. It is particularly but not exclusively applicable to the presentation to an observer of an image in which potential regions of interest in the image are selected and prioritised.

An operator of remotely-controlled equipment often is presented with an image as seen by the equipment or by some other remote image source. The operator is required to interpret the image, and then to direct the remotely-controlled equipment to respond appropriately. As an example, the remotely-controlled equipment may be an unmanned aerial vehicle (UAV) which carries a video camera whose images are transmitted to an operator on the surface or in another aircraft. The operator is required to interpret the images and to determine which of the possible features of interest revealed in the images (hereinafter for convenience "targets") should be engaged or further investigated by the UAV. Because the images may show many possible targets, it is important that the operator correctly identifies the most important ones.

Generally a potential target will present itself in the image as being of contrasting intensity (brighter or darker) relative to its surroundings. Thus any contrasting area is potentially of interest, and the present invention is directed, at least in its preferred embodiments, to assessing and prioritizing such areas of the image, so that the most target—like are presented preferentially to the operator.

In one aspect, the invention provides an image processing method in which features of interest are prioritised for presentation to an observer, comprising selecting features in the image according to total contrast (as herein defined), sorting the selected features according to size and ranking the sorted features according to their approximation to a preferred size.

By "total contrast" we mean the total relative intensity of a feature of interest (hereinafter the FOI) relative to the surrounding parts of the image. It will be appreciated that the total relative intensity is a function of the local intensity from point to point summed over the area of the FOI. Thus an intense but small FOI can have the same total contrast as a larger but less intense one.

The method may comprise filtering the image so as to emphasize local changes of contrast therein, and selecting features of interest according to the local magnitude of the filter response.

In another aspect, the invention provides an image-processing method comprising convolving a selected FOI within the image with a mask of a first size, repeating the convolution with a mask of a second size, and calculating the ratio of the convolution results, as an indication of the size of the FOI.

By assessing the feature of interest according to its size, it is possible to recognise those which are of size appropriate to the targets being sought. For example, it is possible to distinguish a vehicle-sized target from a much smaller but more intense feature such as a small fire or a decoy flare, which could provide a return in the processed image comparable to the lower-intensity but larger return provided by a vehicle.

The method may comprise comparing the ratio with a preferred range of ratio values and assigning to the FOI a score which indicates the closeness of the ratio to a value associated with a preferred size of FOI.

The convolution preferably is one which is linearly responsive to contrast changes.

The convolution may be Laplacian of Gaussian. Alternatively, it may be Difference of Gaussian or Determinant of Hessian.

The masks may be squares having sides defined by odd numbers of pixels of the image. Alternatively they could be other shapes, for example elongated rectangles if the targets of interest are long and thin.

The method may be repeated for at least one further selected FOI, and the FOIs may be ranked according to their ratios or their assigned scores.

The method may comprise filtering an input image and selecting as a FOI a region for which the filter response is a local maximum.

Also it may comprise selecting as a single FOI two said local maxima which fall within a template representative of the preferred size of FOI.

The input image may be a band-pass filtered image. The band-pass filtered image may be produced by convolving an input image with a Gaussian blur and a high-pass filter.

The method may comprise identifying as a said local maximum a pixel of the filtered image which has a filter response greater than that of any other pixel which is contiguous with the pixel.

The identified local maxima may be ranked in order of filter response magnitude.

There may be considered for identification as a said local maximum only pixels having a filter response exceeding a threshold value.

The threshold value may be adjusted so as to limit the number of pixels considered for identification as said local maxima.

Those local maxima whose filter responses exceed a second higher threshold value may be ranked as equal.

The second threshold value may be adjusted so that the number of local maxima whose filter response exceed that threshold value tends towards a predetermined number.

A said threshold value may be adjusted by means of an alpha filter.

A further aspect of the invention provides image processing apparatus configured to operate a method as set forth above.

Preferably the prioritised FOIs are highlighted by superimposing them on an image displayed to the operator.

The invention also provides a computer-readable medium comprising a computer program which when installed and operated performs a method as set forth above.

The invention now will be described merely by way of example with reference to the accompanying drawings, wherein;

FIGS. 3, 4, 5 and 6 illustrate the operation of parts of the algorithm,

FIGS. 7 and 9 show the logic employed in parts of the algorithm, and

Figure 1:
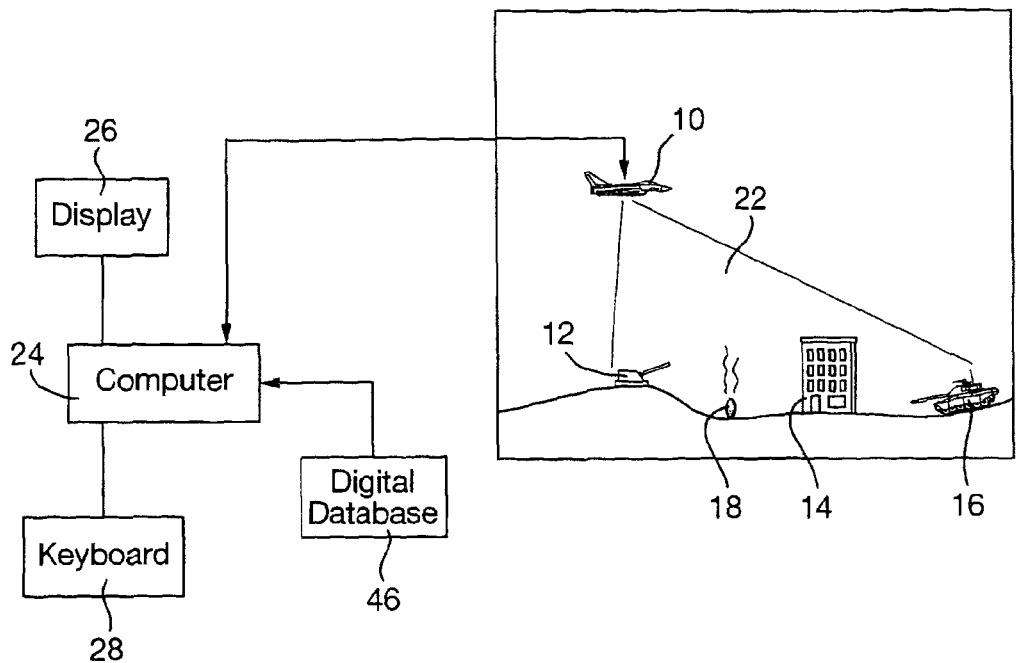
FIG. 1 illustrates a typical operational scenario of a UAV.

Referring to FIG. 1, a UAV 10 is shown over-flying terrain containing a gun emplacement 12, a building 14, an armoured combat vehicle (tank) 16 and a small but intense fire 18.

As known per se, the UAV has an on-board camera with a field of view 22 which transmits images back to a ground station, whereat the images are processed by a computer 24 and displayed on a display 26 for interpretation by an operator, who controls the UAV via a keyboard 28 which typically also includes a joystick.

Depending on his interpretation of the received images, the operator may (for example) instruct the UAV to examine one or more of the targets more closely, or to engage it, or to take no action. The four illustrated targets in practice may be only a small proportion of a much larger number, and the computer 24 contains image processing software according to the invention to sort and prioritize the features of interest seen by the UAV's camera before the images are presented to the operator.

Figure 2:
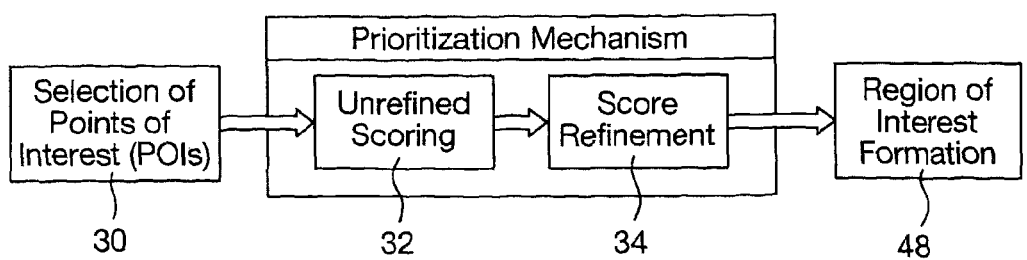
FIG. 2 shows the key algorithmic blocks of an embodiment of the invention.

Referring to FIG. 2, the image processing routine in this preferred embodiment comprises an initial selection 30 of potential points of interest (image features) followed by a two-stage scoring procedure 32, 34 which results in the display to the operator of target-like regions of interest, here the gun emplacement and tank 12, 16.

Figure 3:
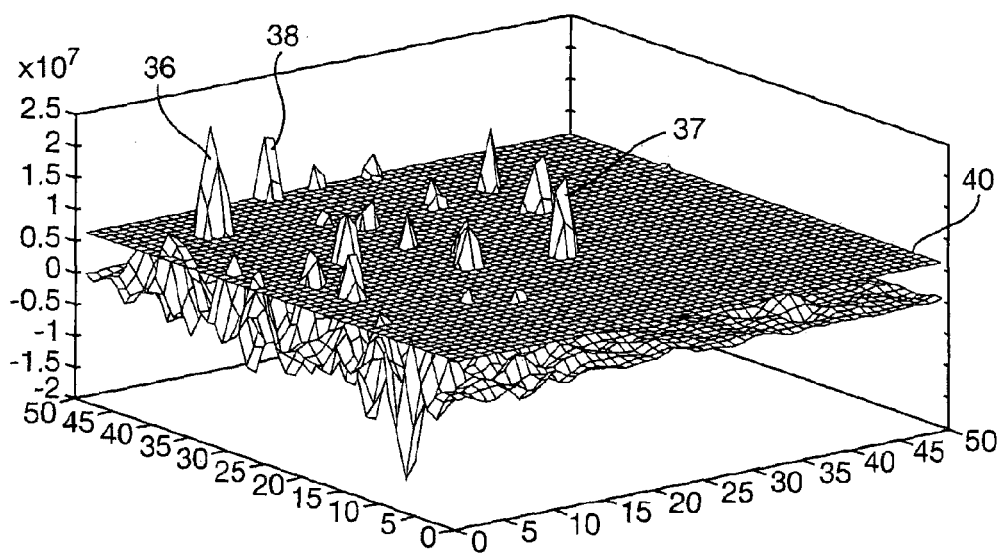

The initial selection of points of interest is achieved by convolving the received image with a band-pass filter comprising a Gaussian blur (which provides a band limit) and a high-pass filter. This will result in a filter response in which local changes in contrast in the original image are identified and emphasised. Put alternatively, the band-pass filter acts as a differentiator and provides an indication of the rate of change of image intensity across the image field. FIG. 3 illustrates the filter response, in which there are a number of potential features of interest represented by local maxima in the filter response, the three largest being 36, 37 and 38. In practice there likely will be many such peaks at this stage of the image processing routine, and the majority of them are discarded in order to focus only on the significant ones, thereby reducing the data-processing load on the computer 24.

Each response therefore is compared to a threshold value 40 so that the majority of responses are rejected immediately, as shown in FIG. 3. The response threshold 40 is adjusted based on the number of responses exceeding the threshold in each image frame, so as to select a manageable number. In FIG. 3, only the three prominent responses 36, 37, 38 would be selected by adjusting the threshold 40. In an alternative embodiment of the invention, each image frame is divided into sub-images. Different threshold values can be applied for each sub-image. This process ensures a more even distribution of Features of Interest across the image.

Figure 4:
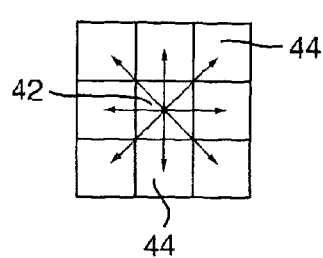
Figure 5:
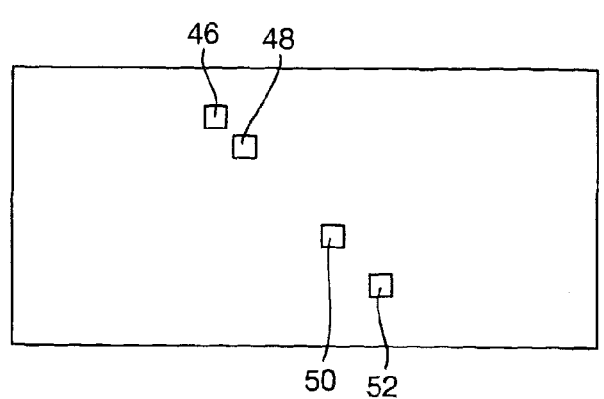

Referring back to the preferred embodiment described in the Figures, each surviving response is then assessed by comparing the pixels forming the image feature with their neighbours. Each pixel 42 (FIG. 4) is compared with its eight immediate neighbours 44, and only local maxima are accepted. A local maximum is a pixel in which the filter response is greater than that in any of the immediately-neighbouring pixels The remaining image features are deemed features of interest (FOI) and these are sorted by response strength, to create an ordered list. Though this step is computationally intensive, the overall processor load is reduced as a result of the preceding steps. Local clusters of FOIs are grouped, since a fragmented image feature may generate multiple FOIs. Each FOI is examined in turn, beginning with the strongest, and any FOI within a predetermined pixel distance of another, calculated according to the size of target being sought is absorbed. For example if the preferred target size is 3×3 pixels, all local maxima falling within a 3×3 template are deemed to be from the same target. Put alternatively, in this case, any local maxima lying within two pixels of each other are assumed to be from the same target. The magnitude of the strongest response from each group of pixels is maintained. Two grouping examples are illustrated in FIG. 5. Pixels 46, 48 stand out from their neighbours and are one pixel apart diagonally.

They fall within a 3×3 template and thus would be rendered as a single FOI if 3×3 is the desired target size. The position of the FOI is determined by the average x and y coordinates of the two pixels. Pixels 50, 52 are two pixels that are further apart diagonally and thus give rise to two distinct FOIs if the desired target size is 3×3. If the preferred target size template is 5×5 pixels however, they would be assimilated as a single FOI.

The FOIs thereby identified are allocated a score indicating their priority. Maximum and minimum scores, $S_{max}$ and $S_{min}$ respectively, define the range of scores. The scoring takes place in two steps:
1. Unrefined scores are produced, based on the band-pass filter convolution response.
2. Scores are refined using a ratio of Laplacian of Gaussian convolution responses.

In the first stage of the prioritization process, each response, R, is compared to an upper and further lower threshold, $T_u$ and $T_l$ respectively. The lower threshold $T_l$ is additional to the threshold 40. Scores, S, are assigned on a linear scale based on the response of each FOI relative to the threshold values. FOIs with responses that fall below the lower threshold $T_l$ are discarded, while FOIs with responses above the upper threshold $T_u$ are capped at the maximum score, $S_{max}$. All responses that fall between the upper and lower thresholds are scored as follows:

$$S = S_{min} + \frac{(S_{max} - S_{min})(R - T_l)}{(T_u - T_l)}$$

The upper and lower thresholds are adjusted using an alpha filter, with parameters dependent on the number of FOIs exceeding each threshold. The generic alpha filter, for k-1, k>0, desired responses exceeding threshold T, is given by $$T = \alpha R_k + (1-\alpha)T, \alpha \in (0,1),$$

where $R_k$ is the $k^{th}$ ranked response. The value of $\alpha$ can be increased to force the threshold to adapt more quickly. The averaging nature of the mechanism ensures that the scoring scheme adapts to persistent changes in the image scene without reacting unnecessarily to individual frame fluctuations. This ensures that scores are consistent across image frames, but adaptive to differing scenarios.

The aim is to adjust the upper and lower thresholds to control the number of FOIs and the associated scores. For the upper threshold, $T_u$, (FIG. 6) a large adjustment is made when the number of FOI responses exceeding the threshold is greater than three or equal to zero, a small adjustment is made when the threshold is exceeded by one or two FOI responses, and no change occurs when exactly three FOI responses are above the threshold, illustrated in FIG. 7. In general this results in two or three FOIs being given a maximum score.

Similarly, the lower threshold is adjusted to allow a set number of FOIs (a number suited to image size, to avoid cluttering of the image) to achieve at least the minimum score, $S_{min}$, with all FOIs scoring less than $S_{min}$ being discarded.

Figure 8:
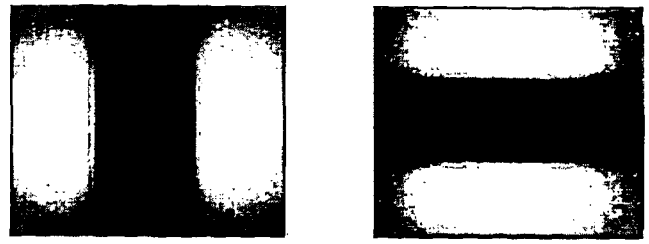
FIG. 8 illustrates typical Laplacian of Gaussian components.

The second stage of the prioritization mechanism, score refinement, is achieved by convolution with a pair of Laplacian of Gaussian masks of different sizes. FIG. 8 illustrates the x and y components of a typical Laplacian of Gaussian mask; light areas are high values and the darkest areas are zero. This representation indicates that a strong response would be expected when the x component (to the left in FIG. 8) is convolved with an area of the image containing a vertical edge, while the y component responds to horizontal edges. A combined strong response from each component is indicative of the presence of a blob in the image.

Convolving each mask with all image pixels would be time consuming, but at this stage, the masks need only be convolved at each of the already-identified FOIs. The principle behind the use of the mask pairs is to reduce the impact of contrast, placing the emphasis on size-matching. Many filters have the disadvantage of providing similar responses for small image features of high contrast and larger image features of moderate contrast. In this embodiment of the invention, however by inspecting the ratio of the two responses from the Laplacian of Gaussian mask pairs, the effect of contrast is reduced. Table 1 lists the theoretical responses of 9×9 pixel and 15×15 pixel masks for various image feature sizes, each a white square on a black background, where C is the contrast of the image feature. With images as received in practice, the resulting ratios are less distinct, but the method nevertheless can provide an efficient means of eliminating false alarms and aiding prioritization.

TABLE 1

Laplacian of Gaussian responses for ideal image features

| | Size (pixels) | |
|---|---|---|
| | 9 × 9 | 15 × 15 |
| | Sigma | |
| Image Feature Size | 1.2 | 2.0 |
| 1 × 1 | 0.221C | 0.080C |
| 3 × 3 | 0.764C | 0.511C |
| 5 × 5 | 0.350C | 0.736C |
| 7 × 7 | 0.056C | 0.557C |
| 9 × 9 | 0.004C | 0.272C |
| 11 × 11 | 0.004C | 0.095C |

Figure 9:
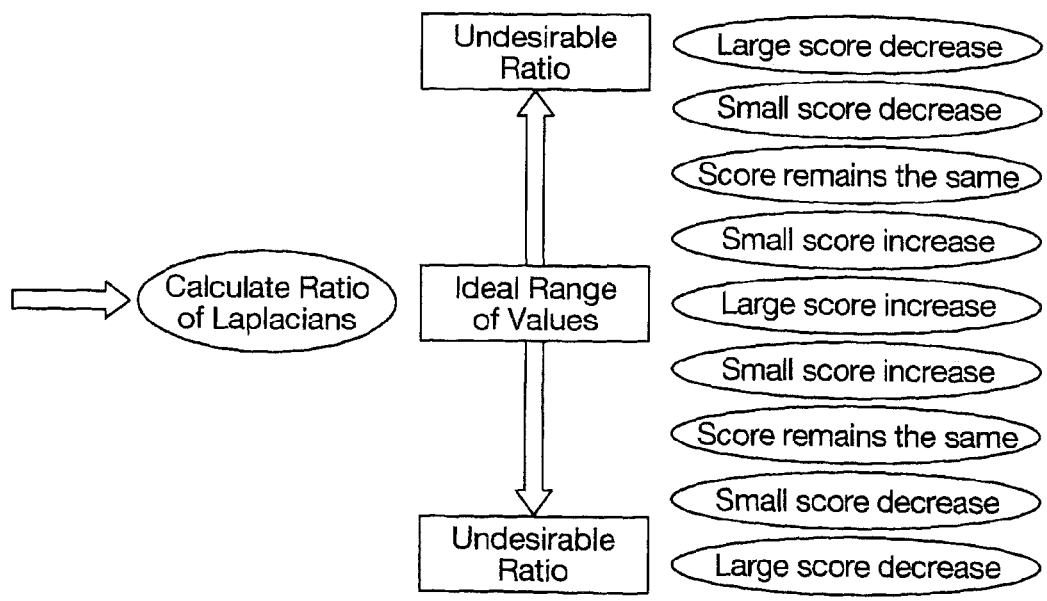

The scoring refinement uses the calculated Laplacian of Gaussian ratio to adjust the FOI score. Using a set of test sequences with marked image feature locations, test data was collected to find a distribution of and expected ratio for the Laplacian responses. FOIs with ratios that closely match the expectation are given a large score increase while FOIs with ratios much further from the expectation are given a score reduction. For example, with reference to table 1, when seeking image features of size 3×3, the Laplacian of Gaussian (LoG) ratio for image features of size 1×1 (here 0.221/0.08=2.76) would likely be significantly larger than the desired ratio for a 3×3 image (0.764/0.511=1.50), resulting in a score decrease. Similarly, it can be seen that features larger than 3×3 pixels yield LoG ratios significantly smaller than 1.5, Thus by reducing the scores of FOIs having LoG ratios outside a preferred range, e.g. 1 to 2 when seeking targets of size 3×3, emphasis can be given to FOIs of the preferred size. The range is initially based on the theoretical values for a white square on a black background, and can be refined using real data. The revised scoring is maintained within the interval [$S_{min}$, $S_{max}$] by capping scores at $S_{max}$ and discarding any FOIs that now score less than $S_{min}$. The result is a prioritized list of FOIs that favours image features of the expected size. The refinement logic is illustrated in FIG. 9. In operational embodiments of the invention, these ratios, and corresponding ratios for other image sizes which the operator may select as of interest, are embodied in look-up tables in a database 46 (FIG. 1) which are accessed according to the desired target size inputted by the operator.

The final stage of the algorithm involves the selection of features of interest 48, FIG. 2, based on the refined score. The result is a list of contrasting features of interest selected according to size, which can be determined by a single parameter inputted by the operator. These FOIs can conveniently be displayed to the operator by superimposing them on the original displayed image with on-screen tags so that those of highest interest are immediately evident.

Considering the theoretical basis of the invention further, it is a characteristic of scale-invariant feature transform (SIFT) operations that the response of a filter is sensitive to both size and contrast, where the band-pass of the filter is selected to give a peak response for objects of a chosen size. Problems can occur when an object, which is not of the chosen in size, has high contrast such that a filter develops a significant response which exceeds the response of a lower contrast object of larger size. As a precursor to developing any normalization process it is necessary to examine filter responses for ideal target objects, in this case a uniform intensity square. A range of scale factors σ need to be considered; these can be selected using the rule relating the side L of the square and the peak response of a Laplacian SIFT operator:

σ=0.4 L and so for object sizes of 3×3, 9×9 and 17×17 pixels, the scale factors are 1.2, 3.6 and 6.8 respectively.

Consider the response of these SIFT filters to a uniform intensity square target of contrast C, on a bland background. The effect of the filter is to eliminate the background response, responding only to the contrast signal of the target. Integrating the filter impulse response function over the entire 2D space results in zero output; the target signal can be thought of as a background signal to which a set of target contrast signals has been added, which generates the filter response. The following table 2 (being similar to table 1, but more detailed) shows the variation in filter response as a function of scale factor and target size:

TABLE 2

Comparison of SIFT Filter Outputs

| Target Size (N × N pixels) | Mask Size = 9 × 9 $\sigma_1 = 1.2$ | Mask Size = 27 × 27 $\sigma_2 = 3.6$ | Mask Size = 51 × 51 $\sigma_3 = 6.8$ |
|---|---|---|---|
| 1 | 0.2210C | 0.0246C | 0.0069C |
| 3 | 0.7638C | 0.1994C | 0.0602C |
| 5 | 0.3510C | 0.4512C | 0.1578C |
| 7 | 0.0556C | 0.6529C | 0.2839C |
| 9 | 0.0038C | 0.7250C | 0.4186C |
| 11 | 0.0038C | 0.6652C | 0.5426C |
| 13 | . | 0.5245C | 0.6400C |
| 15 | . | 0.3640C | 0.7008C |
| 17 | . | 0.2260C | 0.7216C |
| 19 | . | 0.1268C | 0.7047C |
| 21 | . | 0.0648C | 0.6569C |
| 23 | . | 0.0303C | 0.5874C |
| 25 | . | 0.0130C | 0.5057C |
| 27 | . | 0.0051C | 0.4204C |

It can be seen that by considering the ratio of the responses of two different mask sizes for a given desired target size, the contrast C is eliminated.

Suppose that we define three categories of target:
Small—3×3 pixels
Medium—9×9 pixels
Large—17×17 pixels
and let the filter response at a pixel to the k-th scale factor be $R(\sigma_k)$. Based on Table 2 a possible scheme for classifying object responses is:

$R(\sigma_1) > R(\sigma_2) \land R(\sigma_1) > R(\sigma_3) \Rightarrow$ Small $R(\sigma_2) > R(\sigma_1) \wedge R(\sigma_2) > R(\sigma_3) \Rightarrow \text{Medium}$ $R(\sigma_3) > R(\sigma_1) \wedge R(\sigma_3) > R(\sigma_2) \Rightarrow \text{Large}$ The operation of the embodiment of the invention herein specifically described can be summarized as follows:

A band-pass filter is convolved with an input image

Significant image features are identified, these being pixels whose filter responses are local maxima, i.e. each one exceeds that of its eight neighbours and a threshold value.

The image features are considered to be features of interest (FOIs), and are sorted by response.

Local clusters of pixels are grouped as a single FOI.

Unrefined scores are based linearly on FOI response values relative to lower and upper thresholds.

Scores are refined using the ratio of two Laplacian of Gaussian convolutions.

A set of prioritized FOIs is sorted according to score.

The invention comprises any novel feature or combination of features herein described, whether or not specifically claimed. The appended abstract is repeated here as part of the specification.

An image-processing method comprises convolving a selected feature of interest (FOI) within the image with a mask of a first size, repeating the convolution with a mask of a second size, and calculating the ratio of the convolution responses, as an indication of the size of the FOI. Preferably the convolution masks are Laplacian of Gaussian. The method can be useful for prioritizing potential targets in a field of view for presentation to an operator.

The invention claimed is:

1. A method of prioritizing potential objects of interest in a field of view for presentation to an operator comprising:
    convolving a selected feature of interest (hereinafter FOI) within an image with a mask of a first size;
    repeating the convolution with a mask of a second size;
    calculating the ratio of the convolution results, as an indication of the size of the FOI;
    repeating the method for at least one further selected FOI; and
    ranking the FOIs according to their indicated size.

2. The method of claim 1 comprising comparing the ratio with a preferred range of ratio values and assigning to the FOI a score which indicates the closeness of the ratio to a value associated with a preferred size of FOI.

3. The method of claim 1 wherein the convolution is Laplacian of Gaussian.

4. The method of claim 1 wherein the masks are squares having sides defined by odd numbers of pixels of the image.

5. The method of claim 2 comprising ranking the FOIs according to their ratios or their assigned scores.

6. The method of claim 1 comprising filtering an input image to provide a filter response and selecting as a FOI a region for which the filter response is a local maximum.

7. The method of claim 2 comprising ranking the FOIs according to their ratios or their assigned scores, filtering an input image and selecting as a FOI a region for which the filter response is a local maximum, and selecting as a single FOI two said local maxima which fall within a template representative of the preferred size of FOI.

8. The method of claim 6 wherein the input image is band-pass filtered.

9. The method of claim 8 comprising producing the band-pass filtered image by convolving an input image with a Gaussian blur and a high-pass filter.

10. The method of claim 6 comprising identifying as a said local maximum a pixel of the filtered image which has a filter response greater than that of any other pixel which is contiguous with the pixel.

11. The method of claim 6 comprising ranking the identified local maxima in order of filter response magnitude.

12. The method of claim 11 comprising considering for identification as a said local maximum only pixels having a filter response exceeding a threshold value.

13. The method of claim 12 comprising adjusting the threshold value so as to limit the number of pixels considered for identification as said local maxima.

14. The method of claim 12 comprising ranking as equal those local maxima whose filter responses exceed a second higher threshold value.

15. The method of claim 14 comprising adjusting the second threshold value so that the number of local maxima whose filter response exceed that threshold value tends towards a predetermined number.

16. The method of claim 12 comprising adjusting a said threshold by means of an alpha filter.

17. The method of claim 1, further comprising selecting a plurality of said features of interest in the image according to total contrast, sorting the plurality of selected features according to their indicated size and ranking the sorted features according to their approximation to a preferred size.

18. The method of claim 17 comprising filtering the image to provide a filter response, so as to emphasize local changes of contrast therein, and selecting features of interest according to the local magnitude of the filter response.

19. The method of claim 17 wherein said sorting is performed by reference to the ratio of a pair of Laplacian of Gaussian convolutions for each selected image.

20. The method of claim 17 comprising superimposing the prioritised features of interest on an image displayed to the observer.

21. An image processing apparatus comprising:
    a receiver for receiving an image; and
    an image processor for prioritizing potential objects of interest in a field of view of the image for presentation to an operator, the processor performing the method of:
        convolving a selected feature of interest (hereinafter FOI) within the image with a mask of a first size;
        repeating the convolution with a mask of a second size;
        calculating the ratio of the convolution results, as an indication of the size repeating the method for at least one further selected FOI; and
        ranking the FOIs according to their indicated size.

22. A non-transitory computer-readable medium comprising a computer program which when installed and operated performs the method of claim 1.

* * * * *